(12) United States Patent
Cormier et al.

(10) Patent No.: US 6,938,548 B1
(45) Date of Patent: Sep. 6, 2005

(54) PRINTING SLEEVE NOISE REDUCER

(75) Inventors: Steven O. Cormier, West Henrietta, NY (US); Joseph L. Baker, Victor, NY (US); Edward T. Miskinis, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/836,865

(22) Filed: Apr. 30, 2004

(51) Int. Cl.$^7$ ................................................ B41F 1/34
(52) U.S. Cl. ................................... 101/480; 101/382.1
(58) Field of Search .............................. 101/217, 375, 101/376, 378, 382.1, 383, 415.1, 480

(56) References Cited

U.S. PATENT DOCUMENTS

| | | | |
|---|---|---|---|
| 650,290 A * | 5/1900 | Wirt ........................... | 181/207 |
| 4,089,265 A * | 5/1978 | White et al. ................. | 101/375 |
| 5,215,013 A | 6/1993 | Vrotacoe et al. ............ | 101/217 |
| 5,745,968 A * | 5/1998 | Genest et al. ................. | 29/270 |
| 6,347,586 B1 | 2/2002 | Boucher et al. ......... | 101/382.1 |
| 6,634,294 B2 * | 10/2003 | Boucher et al. ......... | 101/382.1 |
| 6,688,226 B2 * | 2/2004 | Rossini et al. ............. | 101/375 |
| 6,732,648 B1 * | 5/2004 | Rogers et al. .............. | 101/375 |

* cited by examiner

Primary Examiner—Ren Yan
(74) Attorney, Agent, or Firm—Lawrence P. Kessler

(57) ABSTRACT

A noise reduction sleeve that fits over a printing sleeve while the printing sleeve is being slid onto or off of a respective cylindrical with the aid of compressed air exiting from holes in the outer surface of the cylinder. The noise reduction sleeve is an open-ended cylinder of felted fibrous material of a length equal to or slightly longer than the printing sleeve, with an axial wall. The noise reduction cylinder has a long section, slightly shorter than the printing sleeve, with an inside diameter slightly larger than the outside diameter of the printing sleeve. The remaining length of the noise reduction sleeve is crimped down to an inside diameter slightly less than the outside diameter of the printing sleeve.

10 Claims, 5 Drawing Sheets

PRINTING SLEEVE NOISE REDUCER

FIELD OF THE INVENTION

The invention relates to replaceable printing sleeves, and more particularly to a device for reducing the noise generated during replacement of such sleeves.

BACKGROUND OF THE INVENTION

Various types of printing apparatus utilize replaceable printing sleeves, such sleeves typically being slid axially over a respective cylinder with the aid of compressed air exiting from holes in the outer surface of the cylinder. For example, replaceable printing sleeves used as printing blankets in offset lithographic printing are known, as are printing sleeves in flexographic printing. In electrostatographic printing apparatus imaging cylinders with photoconductive film sleeves may be replaceable as described above.

Offset lithographic printing apparatus include a plate cylinder and a blanket cylinder. The plate cylinder carries a printing plate having a surface on which an inked image is formed. The blanket cylinder carries a printing blanket. The plate on the plate cylinder transfers the inked image to the blanket on the blanket cylinder at a nip between the plate cylinder and the blanket cylinder. The blanket on the blanket cylinder subsequently transfers the inked image to the receiver material, such as a sheet or web of paper. In electrostatographic printing an electrostatic latent image is formed on a primary image-forming member such as a photoconductive surface and is developed with a thermoplastic toner powder to form a toner image. The toner image is thereafter transferred to a receiver member, e.g., a sheet of paper or plastic, and the toner image is subsequently fused or fixed to the receiver member in a fusing station using heat and/or pressure.

Offset lithographic printing blankets and electrostatographic photoconductive imaging members may both be formed as a tube which is mounted on a respective cylinder by sliding the tube axially over the cylinder. Such printing members will henceforth be generically referred as printing sleeves. Typically such printing sleeves include a metal cylindrical sleeve, for example nickel, aluminum, or the like, with the active printing element applied to the outer surface. The printing sleeve is receivable over the respective cylinder with an interference fit. The cylinder is equipped with air flow passages and openings to direct a pressurized flow of air over the outer surface of the cylinder. When the printing sleeve is located over the air flow openings in the cylinder, the pressurized flow of air expands the printing sleeve diametrically. The printing sleeve can be move axially onto or off of, the cylinder when in its expanded condition. When the pressure is relieved, the sleeve contracts diametrically against the cylinder and thus establishes an interference fit with the cylinder.

An unpleasant result of using pressurized air to install printing sleeves over cylinders as described above is a rather loud, high pitched noise that results from the high pressure, high velocity air flow between the printing sleeve and cylinder. Such noise begins as soon as the printing sleeve begins to expand as the lead edge passes over the first air flow openings and persists until the printing sleeve is completely slid over the cylinder and the air pressure is relieved.

U.S. Pat. No. 5,215,013 to Vrotacoe, et al. discloses a tubular printing blanket with a damping ring on the inside of the tube at one end to dampen vibrations of the tube and reduce the resultant noise. The device of the Vrotacoe patent has the disadvantages that a damping ring is required on every sleeve, thus increasing the cost, and only adequately reduces noise when the sleeve is placed fully over the cylinder, not during axial sliding. Also, the sleeve with damping ring at one end can only be installed with the opposite end as lead edge. U.S. Pat. No. 6,347,586 to Boucher, et al. discloses a cylinder provided with a sound-damping surface to an outer surface of the cylinder at the free end. A disadvantage of the approach of the Boucher patent is that it requites an extension of the cylinder thereby requiring more space.

SUMMARY OF THE INVENTION

In light of the above, the object of this invention is to provide an effective low cost solution to the problem of noise generated during installation and removal of printing sleeves over cylinders using high pressure air assist. The invention is a noise reduction sleeve that fits over the printing sleeve during installation and removal. The noise reduction sleeve is an open-ended cylinder of length equal to or slightly longer than the printing sleeve, with an axial wall including felted fibrous material. The noise reduction cylinder has a long section, slightly shorter than the printing sleeve, with an inside diameter slightly larger than the outside diameter of the printing sleeve. The remaining length of the noise reduction sleeve is crimped down to an inside diameter slightly less than the outside diameter of the printing sleeve. Starting with the long section, the noise reduction sleeve may thereby be slid completely over the printing sleeve, with a loose fit over the length of the long section and a tight contacting fit at the shorter necked down section. With the noise reduction sleeve thus covering the printing sleeve when the printing sleeve is installed or removed from the respective cylinder with the high pressure air assist described above, the noise is reduced to a barely discernable level, both as the printing sleeve is being slid onto the cylinder and after it is on completely. Without the crimped down section at the trailing end of the noise reduction sleeve the noise is still effectively reduced as the printing sleeve is being slid onto the cylinder, but the noise returns at the point that the printing sleeve is completely on the cylinder.

The invention, and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings, in some of which the relative relationships of the various components are illustrated, it being understood that orientation of the apparatus may be modified. For clarity of understanding of the drawings, relative proportions depicted or indicated of the various elements of which disclosed members are included may not be representative of the actual proportions, and some of the dimensions may be selectively exaggerated.

FIG. 5b is a side elevational showing a second helically wound layer over the first layer of FIG. 5a.

DETAILED DESCRIPTION OF THE INVENTION

Figure 1:
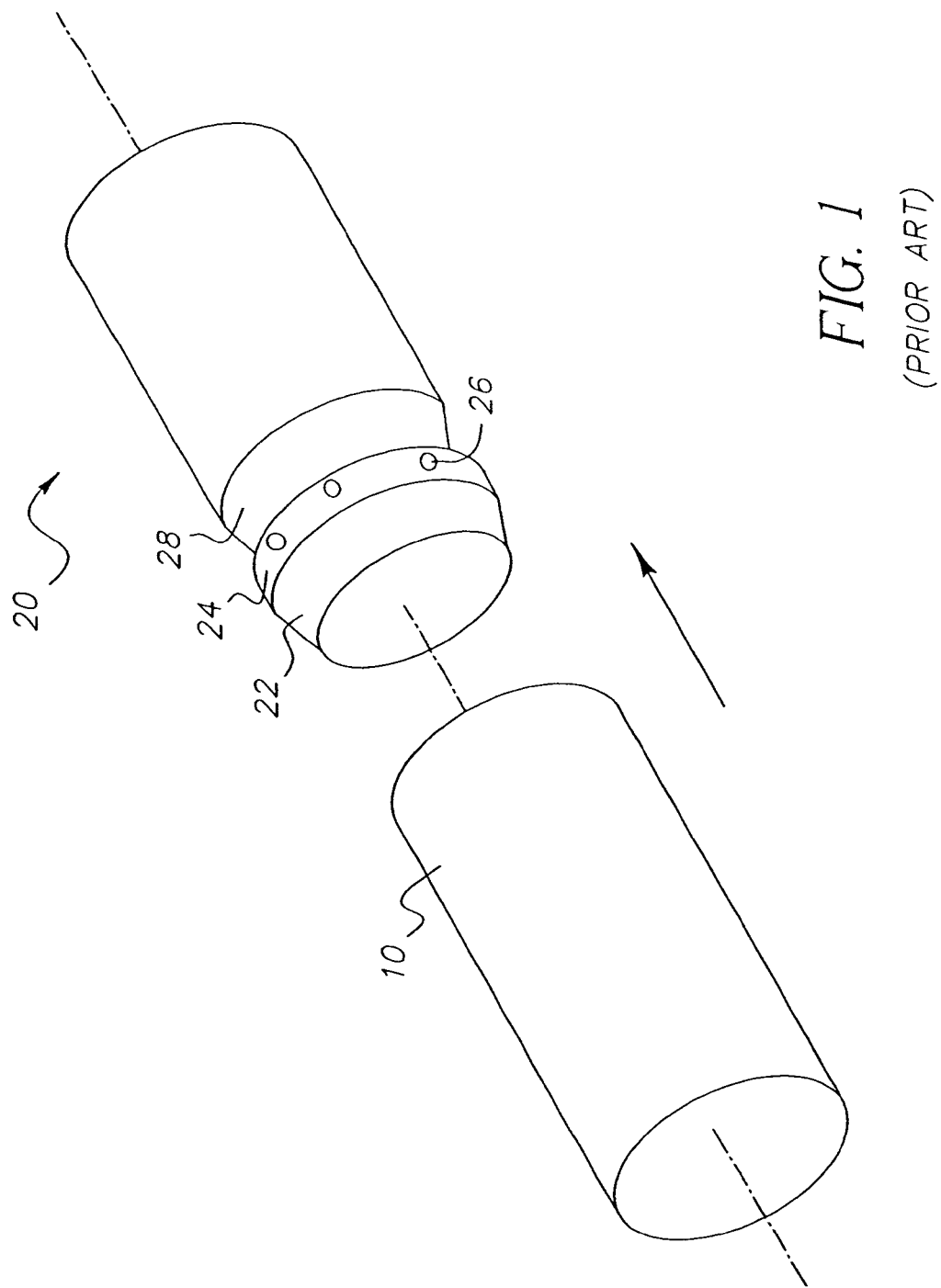
FIG. 1 is a schematic isometric view of a printing sleeve in a position ready to be slid onto a cylinder.
Figure 2:
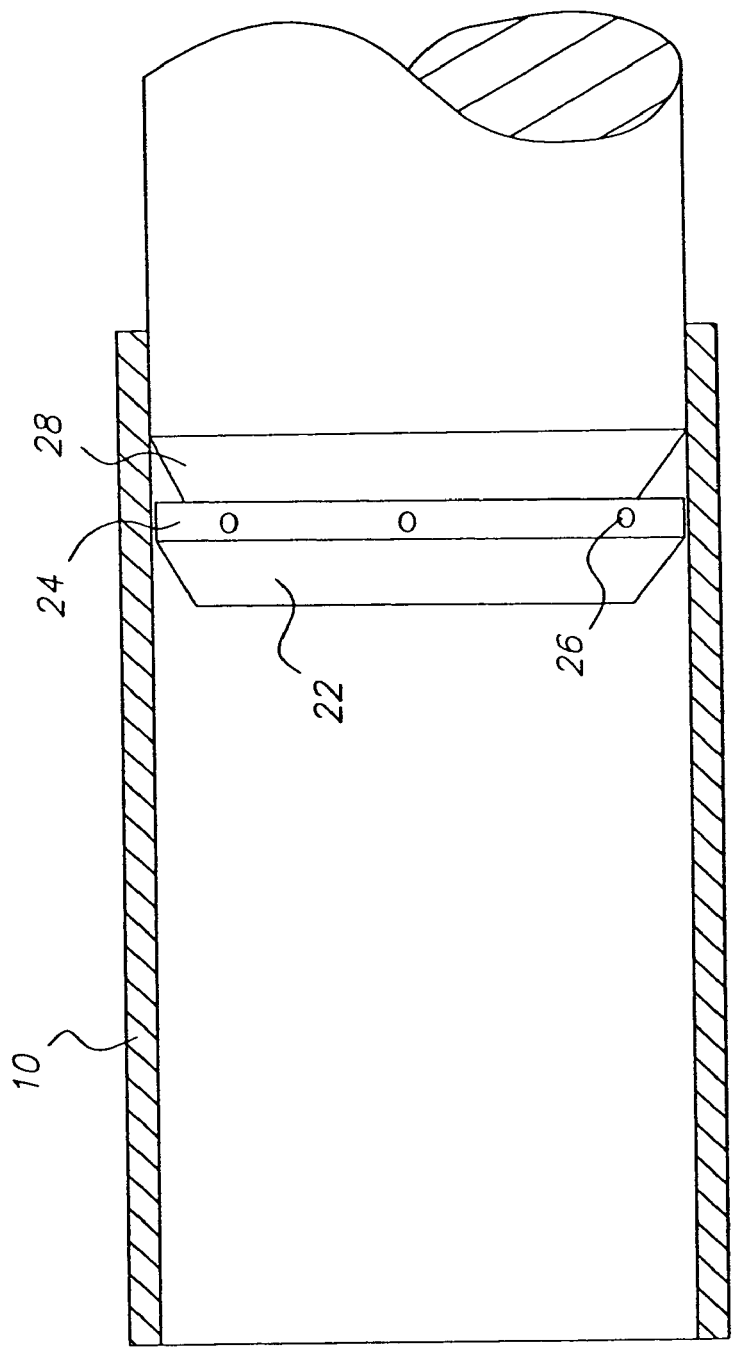
FIG. 2 is a side elevation view showing a printing sleeve slid partially onto a cylinder.

FIG. 1 shows a schematic isometric view, according to the prior art, of a printing sleeve 10 in a position ready to be slid onto a cylinder 20 by moving in the direction of the arrow. Cylinder 20 has, at its free end, a tapered section 22 to facilitate starting printing sleeve 10 onto cylinder 20. Cylinder 20 further has a section 24 at which air holes 26 present themselves for providing air pressure to expand printing sleeve 10 diametrically thereby enabling printing sleeve 10 to be easily slid over the remaining length of cylinder 20. FIG. 2 shows a side elevational view, according to the prior art, of printing sleeve 10, in section, partially slid onto cylinder 20. All common elements in all the figures are identified with the same numerals. An unpleasant high-pitched noise begins as soon as the leading edge of printing sleeve 10 encounters air holes 26 and begins to be expanded. This unpleasant noise persists as printing sleeve 10 is being slid onto cylinder 20 and after printing sleeve 10 is completely on cylinder 20, until the pressurized air is relieved. When it becomes necessary to remove printing sleeve 10 from cylinder 20 the noise begins as soon as the pressurized air is activated and persists until printing sleeve 10 is completely removed.

Figure 3:
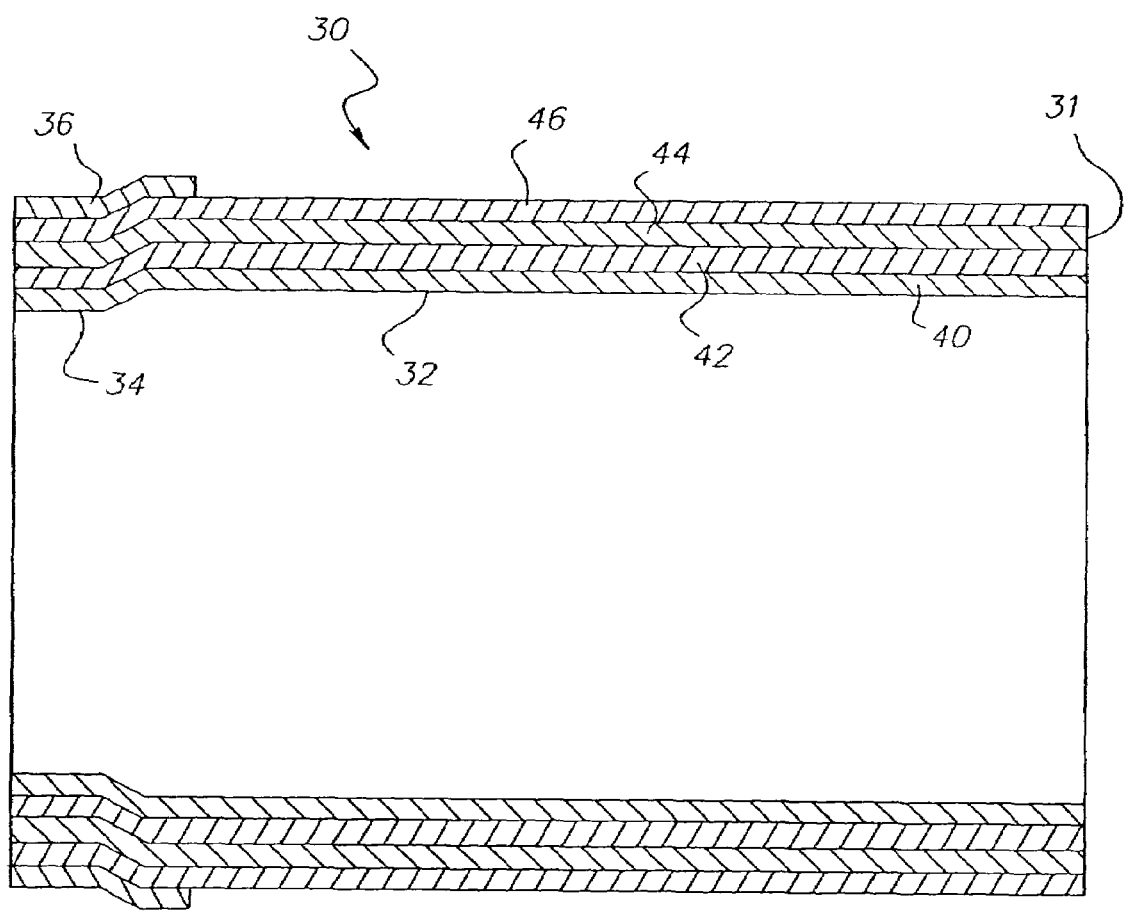
FIG. 3 is a side elevation sectioned view of the noise reduction sleeve of the invention showing the layered structure of the axial wall.

The invention is a noise reduction sleeve that is slid over printing sleeve 10, either prior to installing printing sleeve 10 onto cylinder 20 or, prior to removing printing sleeve 10 from cylinder 20. FIG. 3 shows a side elevational, sectioned view of the noise reduction sleeve, denoted as numeral 30. It has been found that the noise reduction function of sleeve 30 is best accomplished by an open-ended cylinder with an axial wall 31 including felted fibrous material. The preferred embodiment, depicted in FIG. 3, has four felted fibrous layers, 40, 42, 44, and 46. For the purpose of this disclosure a felted fibrous layer is defined as any fabric of matted, compressed fibers such as wool, fur, wood, or the like, sometimes mixed with vegetable or synthetic fibers. Such felted fibrous layers are typically made by breaking up of the raw materials in a liquid to form a suspension of individual fibers and forming of felted sheets by spreading the suspension on a suitable porous surface through which the liquid either drains or evaporates. Paper is perhaps the most common of such felted fibrous materials. In the preferred embodiment shown in FIG. 3 each layer, 40, 42, 44, and 46 of axial wall 31 is approximately 0.33 mm thick paper.

Figure 4:
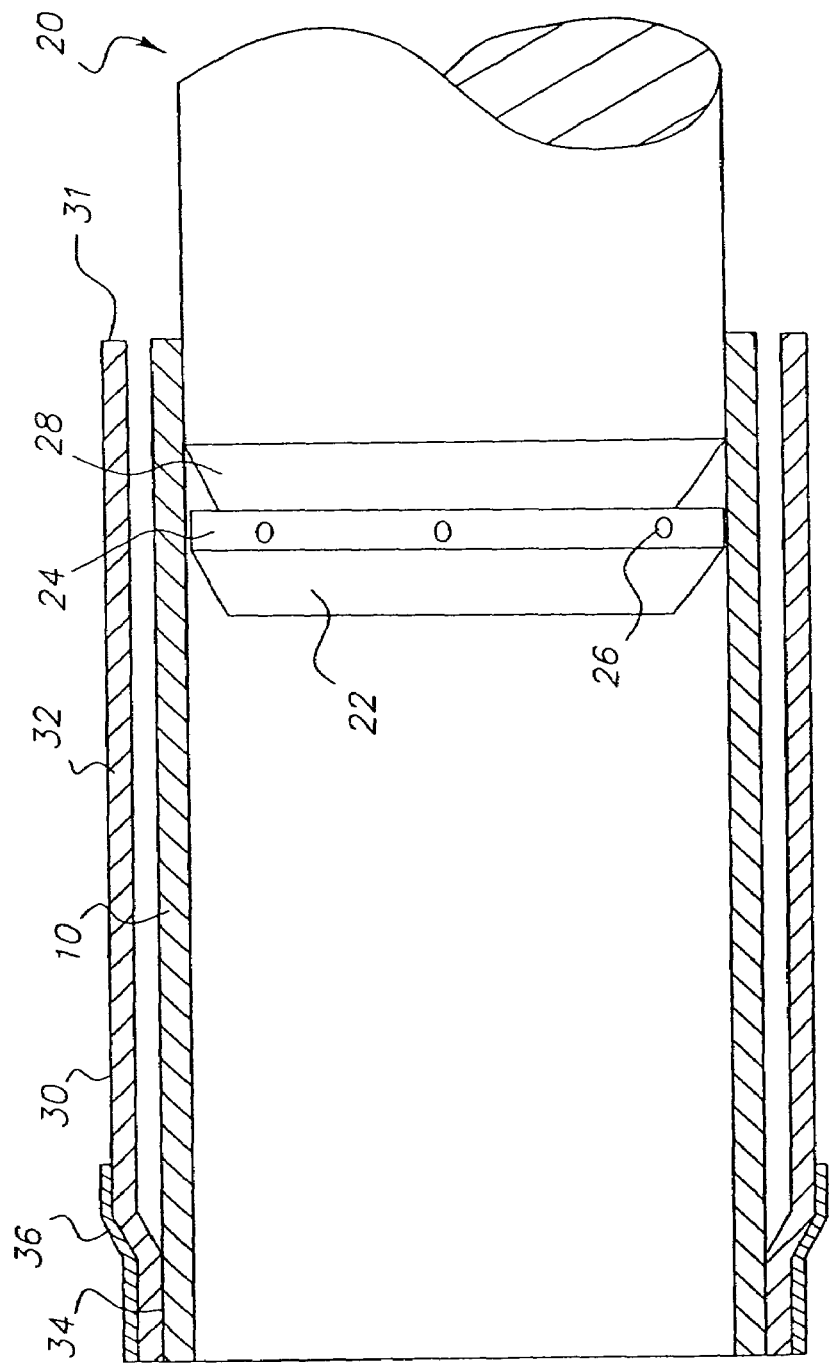
FIG. 4 is a side elevational view of a printing sleeve covered with a noise reduction sleeve and slid partially onto a cylinder.

FIG. 4 shows the same side elevational view as FIG. 2 but with noise reduction sleeve 30 slid over printing sleeve 10. Axial wall 31 of noise reduction sleeve 30 has a main section 32, which is approximately 20 mm shorter than printing sleeve 10, and a necked-down section 34 for the remaining length of noise reduction sleeve 30. In FIG. 4 the overall length of noise reduction sleeve 30 is shown about equal to the length of printing sleeve 10, but noise reduction sleeve 30 may be somewhat longer than printing sleeve 10, as much as several centimeters, provided that the increased length is added to the necked-down section 34. The inside diameter of main section 32 is approximately one mm greater than the outside diameter of printing sleeve 10 and the inside diameter of necked-down section 34 is approximately one mm less than the outside diameter of printing sleeve 10. The inside diameter of main section 32 is a result of the trade-off between the ability to slide it over printing sleeve 10 and the amount of noise reduction. The greater the gap between the outside surface of printing sleeve 10 and the inside surface of noise reduction sleeve 30, the less reduction of noise will occur. Therefore the inside diameter of main section 32 of noise reduction sleeve 30 is just large enough to permit it to be easily slid over printing sleeve 10.

The inside diameter of necked-down section 34 is such as to insure a snug frictional fit of necked-down section 34 over printing sleeve 10 in order to hold noise reduction sleeve 30 in place on printing sleeve 10 while printing sleeve 10 is being slid onto cylinder 20. Noise reduction sleeve 30 may be initially formed with a uniform inside diameter for its entire length, and necked-down section 34 subsequently formed by a crimping operation well known in the art. If necked-down section 34 is absent, the noise reduction will be effectively reduced as the printing sleeve 10, covered by a uniform diameter noise reduction sleeve, is slid onto cylinder 20, but will begin again when printing sleeve 10 is completely on cylinder 20. So necked-down section 34 is required to maintain noise reduction when printing sleeve 10 is completely on cylinder 20. The outer surface of necked-down section 34 is covered with an elastic moisture impervious band 36 to maintain dimensional stability against environmental variations. In the preferred embodiment, band 36 is a urethane rubber band.

Figure 5A:
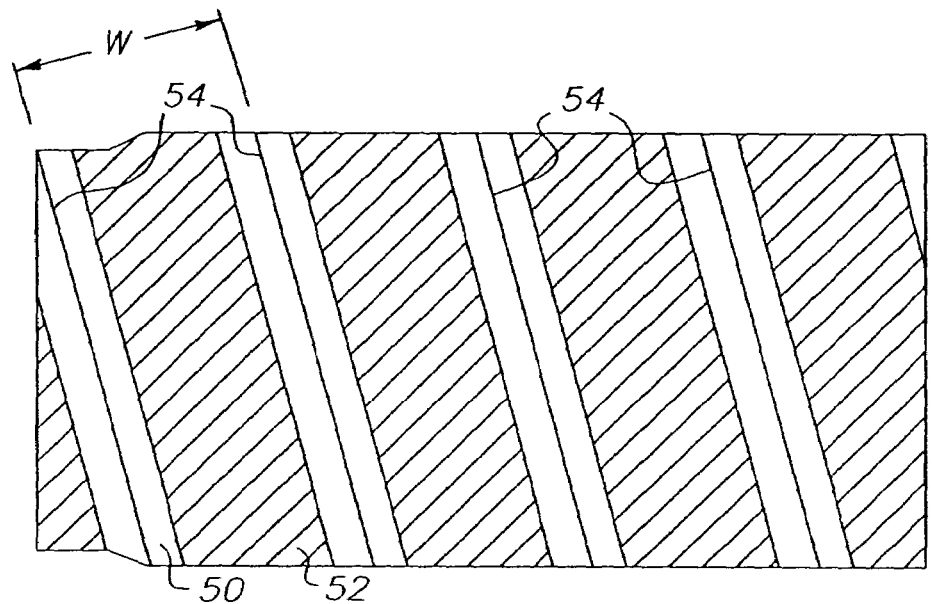
FIG. 5a is a side elevational showing a first helically wound layer of a noise reduction sleeve.
Figure 5B:
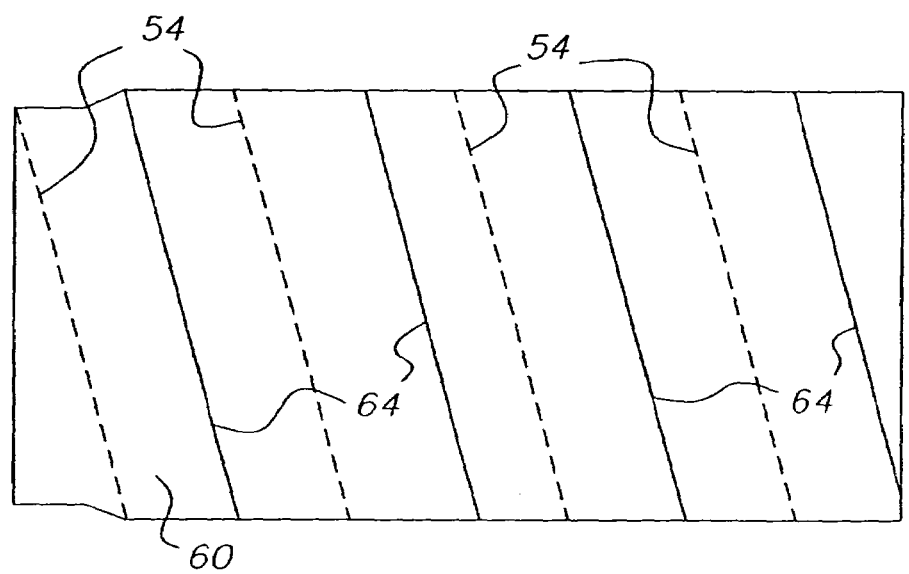

In the preferred embodiment, axial wall 31 is formed by helically winding successive strips of the felted fibrous material on a cylindrical mandrel followed by squaring off of the ends. Each successive helically wound layer is adhesively bonded to the previous layer. FIGS. 5a and 5b illustrate how the first two layers would be formed by this process. FIG. 5a shows a side elevational view of a first layer formed by helically winding a first strip 50 of felted fibrous material of width W. Strip 50 is wound so that its edges butt as it is wound. The lines labeled with numeral 54 represent the seam formed by the butted edges of first strip 50. The shades area labeled with numeral 52 in FIG. 5a represent the adhesive applied to strip 50 in preparation for winding the next strip over first strip 50. The adhesive 52 is held back from seams 54 to ensure that no adhesive bleeds through the seam 54 to the inside surface of the noise reduction sleeve. Typically the width of the adhesive may be approximately 80% of the width of first strip 50. FIG. 5b shows a side elevational view with a second strip 60 helically wound over first strip 50. The lines labeled 64 represent the seam formed by the butted edges of second strip 60. The winding of second strip 60 is offset from first strip 50 so that the seam 64 does not fall over seam 54, which is represented by the dashed lines in FIG. 5b. Subsequent helically wound layers may be added in the same manner, with the exception that it is no longer necessary to hold subsequent adhesive layers back from the second and succeeding seams as there will be no way for it to bleed through to the inside surface.

The invention has been described in detail with particular reference to certain preferred embodiments thereof, but it will be understood that variations and modifications can be effected within the spirit and scope of the invention.

What is claimed is:

1. A noise reduction sleeve for use with a tubular printing sleeve, said printing sleeve being slid axially over a respective cylinder with the aid of compressed air exiting from holes in the outer surface of said cylinder, said noise reduction sleeve comprising:

a cylinder with an axial wall, open ends, and at least as long as said printing sleeve; and said axial wall including a felted fibrous material, wherein said cylinder has a main section with inside diameter substantially equal to or slightly larger than the outside diameter of said printing sleeve and a necked down section, contiguous with said main section, with inside diameter substantially equal to or slightly less than the outside diameter of said printing sleeve, said main section and said necked down section extending substantially the length of said printing sleeve, thereby enabling said cylinder to be slid over said printing sleeve.

2. The noise reduction sleeve of claim 1, wherein said felted fibrous material includes two felted fibrous layers adhesively bonded together, a first inner felted fibrous layer and a second felted fibrous layer around said first felted fibrous layer.

3. The noise reduction sleeve of claim 2, further comprising an elastic band around said necked down section.

4. The noise reduction sleeve of claim 1, wherein said felted fibrous material includes three felted fibrous layers adhesively bonded together, a first inner felted fibrous layer, a second felted fibrous layer around said first felted fibrous layer, and a third felted fibrous layer around said second felted fibrous layer.

5. The noise reduction sleeve of claim 4, further comprising an elastic band around said necked down section.

6. The noise reduction sleeve of claim 1, wherein said felted fibrous material includes four felted fibrous layers adhesively bonded together, a first inner felted fibrous layer, a second felted fibrous layer around said first felted fibrous layer, a third felted fibrous layer around said second felted fibrous layer, and a fourth felted fibrous layer around said third felted fibrous layer.

7. The noise reduction sleeve of claim 6, further comprising an elastic band around said necked down section.

8. The noise reduction sleeve of claim 1, further comprising an elastic band around said necked down section.

9. The noise reduction sleeve of claim 1, wherein said felted fibrous material is a plurality of paper layers, each between 0.25 and 0.40 mm thick.

10. The noise reduction sleeve of claim 1, wherein each layer of said felted fibrous material comprises a helically wound strip of felted fibrous material having a width between 30 and 400 mm measured laterally between the longitudinal edges of said helically wound strip, and wound at an angle such that the edges of said helically wound strip butt together.

* * * * *